United States Patent
Mäder (10) Patent No.: US 8,913,286 B2
(45) Date of Patent: Dec. 16, 2014

(54) OPTICAL DETECTION METHOD DURING PRINT FINISHING

(75) Inventor: Carl Conrad Mäder, Hittnau (CH)

(73) Assignee: Ferag AG, Hinwil (CH)

( * ) Notice: Subject to any disclaimer, the term of this patent is extended or adjusted under 35 U.S.C. 154(b) by 845 days.

(21) Appl. No.: 13/055,927

(22) PCT Filed: Apr. 22, 2009

(86) PCT No.: PCT/CH2009/000128
§ 371 (c)(1),
(2), (4) Date: Mar. 18, 2011

(87) PCT Pub. No.: WO2010/009562
PCT Pub. Date: Jan. 28, 2010

(65) Prior Publication Data
US 2011/0181896 A1     Jul. 28, 2011

(30) Foreign Application Priority Data

Jul. 25, 2008 (CH) ........................... 1175/08

(51) Int. Cl.
| | |
|---|---|
| H04N 1/60 | (2006.01) |
| B65H 29/40 | (2006.01) |
| B65H 7/02 | (2006.01) |
| B65H 43/08 | (2006.01) |
| B65H 39/065 | (2006.01) |
| B65H 29/66 | (2006.01) |
| G06T 7/00 | (2006.01) |

(52) U.S. Cl.
CPC ............... *B65H 43/08* (2013.01); *B65H 29/40* (2013.01); *B65H 2511/216* (2013.01); *G06T 2207/20056* (2013.01); *B65H 2511/232* (2013.01); *B65H 7/02* (2013.01); *B65H 2511/242* (2013.01); *B65H 2404/65* (2013.01); *B65H 2511/20* (2013.01); *G06T 2207/30144* (2013.01); *B65H 2553/82* (2013.01); *B65H 2301/445* (2013.01); *B65H 2553/42* (2013.01); *B65H 39/065* (2013.01); *B65H 29/66* (2013.01); *G06T 7/0042* (2013.01)
USPC .......................................... 358/1.9; 358/1.18

(58) Field of Classification Search
None
See application file for complete search history.

(56) References Cited

U.S. PATENT DOCUMENTS

| | | | |
|---|---|---|---|
| 5,613,669 A * | 3/1997 | Grueninger | ................ 270/52.06 |
| 6,845,288 B2 | 1/2005 | Pierel et al. | |
| 7,780,163 B2 | 8/2010 | Schinzel-Reiner et al. | |
| 2003/0113000 A1 | 6/2003 | Hyoki et al. | |
| 2004/0163562 A1 | 8/2004 | Lewis et al. | |
| 2008/0030798 A1* | 2/2008 | O'Neil | .......................... 358/448 |
| 2008/0063298 A1* | 3/2008 | Zhou et al. | .................... 382/280 |
| 2008/0278735 A1* | 11/2008 | Wang et al. | ..................... 358/1.5 |

FOREIGN PATENT DOCUMENTS

| | | |
|---|---|---|
| DE | 32 32 490 A1 | 3/1983 |
| DE | 102 14 531 A1 | 10/2002 |
| EP | 0 534 115 A1 | 8/1992 |

OTHER PUBLICATIONS

International Search Report mailed by European Patent Office on Oct. 13, 2009 in the corresponding PCT patent application No. PCT/CH2009/000128.

\* cited by examiner

*Primary Examiner* — Barbara Reinier
*Assistant Examiner* — Christopher D Wait
(74) *Attorney, Agent, or Firm* — Knobbe, Martens, Olson & Bear, LLP

(57) ABSTRACT

An optical control method for use in print finishing, comprising the following steps: First, guiding a planar printed product along a conveying path past at least one optical sensor (14). Secondly, detecting an electronic image (2) by the optical sensor, wherein the electronic image (2) comprises at least one region of the printed product. Third, extracting orientation information of the printed product from the electronic image. Fourth, comparing (51) the orientation information of the printed product from the electronic image with reference orientation information, and generating at least one signal on the basis of a result of the comparison.

16 Claims, 6 Drawing Sheets

OPTICAL DETECTION METHOD DURING PRINT FINISHING

This application is the U.S. National Phase under 35 U.S.C. §371 of International Application PCT/CH2009/000128, filed Apr. 22, 2009, which claims priority to Swiss Application No. 1175/08, filed Jul. 25, 2008, the entireties of which are hereby incorporated herein by reference.

The present invention falls within the field of print finishing and relates to an optical control method for detecting the position and orientation of planar, flexible printed products during print finishing, and an apparatus for carrying out such a control method.

A plurality of control methods for detecting faulty or incorrect planar, flexible printed products during print finishing are known at the present time. In this case, at least one optical sensor in each case generates at least one current image of a printed product, which is subsequently compared with a reference image in an image processing unit.

EP 534115 A1 is concerned with a method and an apparatus for testing the uniformity of printed sheets in order to ensure that the desired printed sheets are situated in a processing station. For this purpose, an electronic image in a processor is initially generated from a comparatively large excerpt from a reference sheet by means of an optoelectronic scanning device. In the case of the subsequent printed sheets, by contrast, only a partial region within a measurement window corresponding to the excerpt is used. The processor then shifts the electronic image of the partial region over the electronic image of the excerpt until a specific, minimum correspondence of a comparison measure is attained. If this is the case, this subsequent printed sheet is signaled as correct, otherwise as incorrect, and a corresponding signal is generated. EP 534115 A1 does not disclose specifically how the position and orientation of a printed sheet are detected.

DE 10214531 A1 discloses a method and a device for measuring the orientation and position of continuous sheets. For this purpose, two digital cameras each record an image of a corner of a printed sheet. In this case, the recording lenses of the cameras are arranged perpendicularly to a viewing plane formed by the sheets. The imaging data are transmitted through a computer unit, which determines the position and orientation of the sheet by means of an image recognition algorithm that determines the respective outermost pixels of the sheet corners. With the aid of these pixels in comparison with known, stored desired coordinates of the pixels, it is possible to determine by what angular position and by what length in a horizontal and vertical direction the sheet is displaced. Afterward, the computer unit passes the correction values determined from desired pixels and actual pixels to a control device of a printing machine, which, by means of regulators, performs an impression cylinder or web travel correction of the printed sheets using servomotors. However, DE 10214531 A1 likewise does not disclose specifically how the position and orientation of a printed sheet are detected.

A different approach is taken by DE 3232490 A1. In this case, the printed sheets lying on a coordinate measurement table are guided along a plurality of densitometers that are movable in the longitudinal and transverse directions. Said densitometers detect color measurement fields specifically arranged for this purpose on the printed sheet and communicate these values to a computer, which evaluates a position measurement on the basis of a reference sheet, determined in a calibration operation mode, by means of comparison.

It is an object of the present invention to further improve the reliable detection of the position and orientation of printed products relative to a reference in order to be able to detect incorrect and faulty printed products reliably and in a timely manner before they lead to disturbances and damage during the further print finishing. It is a further object of the present invention to reduce the computational capacity for the image processing.

The object on which the invention for the method is based is achieved by means of the features of patent claim 1. Dependent patent claims 2 to 14 relate to further embodiments.

The optical control method according to the invention for use in print finishing comprises at least the following steps: firstly, guiding a planar printed product along a conveying path past at least one optical sensor. Secondly, detecting an electronic image by means of the optical sensor, wherein the electronic image comprises at least one region of the printed product. Thirdly, extracting orientation information of the printed product from the electronic image. Fourthly, comparing the orientation information of the printed product from the electronic image with reference orientation information, and fifthly, generating at least one signal on the basis of a result of the comparison.

In this case printed products are understood to mean both individual printed products and groups of a plurality of printed products. In this case, the printed products comprise at least respectively one planar, flexible print product or printed product which can in turn comprise a main product and/or at least one partial product. Likewise, one printed product, or a plurality of printed products, and/or one print product or a plurality of print products or a combination thereof, can be inserted, collected or collated into a cover or a further object. Furthermore, the main product and/or the partial product can be inserts of all types, for example a sample.

Depending on the embodiment of the control method according to the invention, extracting the orientation information takes place on the basis of geometry data of the detected printed product or on the basis of at least one image content of the detected printed product.

The volumes of data to be processed are comparatively high when dealing with a complex objective such as determining a translation offset with a superimposed rotation offset using known control methods, which has an adverse effect on the time required for achieving the objective. For this reason, there is a constant need for a control method which is suitable for use in high-speed systems. In the control method of the present invention the computational capacity for the image processing is firstly reduced by the computationally complex objective being separated into two simpler partial objectives, namely determining the orientation in a first partial step and determining the position in a second partial step. Secondly, experiments have confirmed that reliable detection results can be achieved in the automatic control method even in the case of electronic images having a comparatively small number of pixels. Consequently, the control method according to the invention requires only a comparatively small number of pixels of the electronic images and hence only relatively small volumes of data, which can consequently be processed sufficiently rapidly. This permits data processing in real time.

The term orientation is understood to mean the rotational or angular orientation of a printed product to be controlled in a Cartesian coordinate system, for example an orientation relative to the conveying direction of a conveying means. The term position is understood to mean the position of a printed product to be controlled in a Cartesian coordinate system, for example a position of a printed product in the X- and y-directions relative to a conveying means.

Orientation information of the detected printed product which is necessary for determining the orientation is extractable using the detection algorithm explained below, for example, which comprises the following steps: firstly, a frequency transformation of the electronic image. Secondly, absolute value formation on the basis of the frequency transformation; and thirdly, generation of the orientation information by means of a polar transformation based on the absolute value formation.

In this embodiment of the control method, the reference orientation information required for the comparison does not originate from a database, but rather is extracted from the reference image as follows, wherein the control method comprises the following steps: firstly, a frequency transformation of a reference image with a reference printed product. Secondly, reference absolute value formation on the basis of the frequency transformation; and thirdly, generation of the reference orientation information by means of a polar transformation based on the reference absolute value formation.

In this case, a pixel of the corrected image f1 to be controlled is situated at the coordinates (x,y). The image f2 (x,y) is defined as image f1 with translation $(x_0,y_0)$ and rotation $\theta_0$ and thus corresponds to the reference image of an optimally oriented reference printed product. For the frequency transformation, Fourier transformation is appropriate in a particularly suitable fashion not least owing to the continuous processing or machine cycle. In this case, the time factor (t) known from time sequences is replaced by a spatial variable (e.g. x, y). The electronic image is interpreted as it were as a signal sequence over a location. Consequently, rather than a time base, pixels, the so-called spatial frequencies, are present in the electronic image. The spatial frequencies are as it were the resolution of the image. The present two-dimensional electronic image accordingly consists of discrete spatial signals which are dependent on the two spatial coordinates or spatial variables (x, y). In the present example, x corresponds to a conveying direction, for example, and y to a direction running transversely with respect to the conveying direction.

$$f_2(x,y)=f_1(x\cos\theta_0+y\sin\theta_0-x_0,-x\sin\theta_0+y\cos\theta_0-y_0)$$

The following thus holds true in the frequency domain:

$$F_2(\xi,\eta)=e^{-j2\pi(\xi x_0+\eta y_0)}F_1(\xi\cos\theta_0+\eta\sin\theta_0,-\xi\sin\theta_0+\eta\cos\theta_0)$$

During absolute value formation for these spectra, a respective absolute value arises in accordance with the electronic image and the reference image. Absolute value is understood to mean a multidimensional absolute value. The property that these absolute values are translation-invariant is used in a targeted manner in the method according to the invention.

$$|F_2(\xi,\eta)|=|F_1(\xi\cos\theta_0+\eta\sin\theta_0,-\xi\sin\theta_0+\eta\cos\theta_0)|$$

During the generation of the reference orientation information by means of a polar transformation based on the reference absolute value formation, the absolute values of the spectra are converted into polar coordinates by means of a polar transformation. In this case, a comparison spectrum assigned to the detected printed product to be controlled and a reference spectrum assigned to the reference printed product arise, which can both be represented graphically.

$$|F_2(\rho,\theta)|=|F_1(\rho,\theta-\theta_0)|$$

A possible rotation offset of the printed product with respect to the reference printed product can be detected in the comparison spectrum as a fictitious translation. The comparison spectrum forms the orientation value, while the reference spectrum forms the reference orientation value.

During a graphical representation of the comparison spectrum, a comparatively clear pattern arises in the case of a printed product that is correct with regard to image content and orientation. A correct printed product is understood to mean the printed product which is required for the print finishing and which is situated relative to the conveying means in a correct position. The correct position is subject to certain tolerances in a manner given by the processing, such that the correct position is actually a position range. In the case of an incorrect and/or faulty printed product, by contrast, the pattern is imperceptible or scarcely perceptible.

During experiments it was possible repeatedly to ascertain that, with such a control method, even printed products which, in comparison with the reference printed product, had only small differences detectable by the optical sensor were clearly and reliably identifiable as such, even though the differences were not immediately discernible to the naked eye. A further advantage of such an embodiment of the control method therefore consists in the fact that even comparatively small deviations lead to distinctly different patterns.

In a next step, the orientation information is compared with the reference orientation information, wherein the comparison is based on a first correlation. A correlation comparison is extremely well suited to multidimensional objects.

If a correlation value of the first correlation exceeds a first threshold value, the at least one signal mentioned above comprises a first signal, which initiates a special treatment of the printed product on which the electronic image is based. The first threshold value serves for distinguishing an actual rotation of the detected printed product by the rotation angle $\alpha$ from noise present in the frequency domain and/or the correlation matrix. If the first correlation value falls below the first threshold value, the printed product to be assessed is identified as inappropriate—for example because it is faulty or incorrect. Corresponding measures for a special treatment of this printed product can thereupon be implemented in a timely manner for example on the basis of a signal explained below. The first threshold value thus forms a quality measure of the similarity of the corrected image to the reference image. In one embodiment of the control method, a rising correlation quality indicates an increasing similarity of the orientation of the printed product contained on the corrected image to the orientation of the reference printed product on the reference image.

Experiments have further shown that, on the basis of the first correlation, it was always possible to distinguish reliably enough between an incorrect/faulty printed product and a rotated, but otherwise correct printed product.

Depending on the result of the first correlation, a rotation angle $\theta$ between the controlled printed product and the reference printed product together with the direction information thereof is calculated on the basis of the orientation information and the reference orientation information. As required, the rotation angle $\theta$ and the direction information are buffer-stored and are available for possible subsequent steps.

As preparation for determining the second property, here in the form of the position of the detected printed product, and possible translational displacements, which can extend both in the x-direction and in the y-direction in the Cartesian coordinate system, the buffer-stored electronic image is computationally rotated back by the angle $\theta$ determined, such that the orientation of the printed product imaged thereon corresponds to that of the reference printed product, namely $\theta_0$. This step facilitates the subsequent comparison of the rotated-back image with the reference image since the otherwise disturbing, superimposed rotation is thereby eliminated. If disturbing influences such as, for instance, an inhomogeneous background adversely influence the image comparison, in an intermediate step only an excerpt from the electronic image continues to be used and, as required, is compared with a corresponding excerpt from the reference image.

In a subsequent step, the rotated-back electronic image is compared with the reference image. The comparison is based on a second correlation of the rotated-back electronic image with the reference image. If a correlation value of the second correlation falls below a second threshold value, the at least one signal comprises a second signal, which initiates a special treatment of the printed product on which the electronic image is based.

The second correlation value correlates with the actual value of the possible translation offset. In this case, the absolute values of the offset in the x-direction and the y-direction in the Cartesian coordinate system can be determined with comparatively high precision. As required, these absolute values of the offset in the x-direction and the y-direction are buffer-stored for subsequent processing steps such as, for instance, of a readjusting unit.

A number of experiments have shown that, with such a control method, even in the case of very similar printed products to be distinguished, it is possible to achieve comparatively high detection rates of almost hundred percent with simultaneous improvement of the robustness of the control method by comparison with the prior art. In this case, it is unimportant whether the printed products have matt or high-gloss surfaces.

In further embodiments of the control method, an arrival or absence of the first signal on the basis of the first correlation has the effect that the second partial step is not carried out in the first place. With this measure, the loading on the image processing unit in terms of data can be relieved further.

As required, the result of the comparison and/or of the correlations can be transmitted to conveying elements of the conveying means that are assigned to the corresponding controlled printed products, for example by a writing station transmitting this information to an RFID transponder of a conveying element, for example of a gripper, said transponder being assigned to the conveying element or being arranged in/on the conveying element.

Depending on the requirements made of the control method according to the invention, sensor-dictated errors are compensated for in the electronic image. Sensor-dictated, optical errors such as, for instance, the so-called pincushion effect and/or as a result of wide-angle lenses cause undesirable distortions in the detected image. Depending on the embodiment, compensation of these sensor-dictated errors is effected by means of a frequency transformation of the detected image for example on the basis of a Fourier or fast Fourier transformation, followed by electronic filtering and a subsequent inverse transformation. An influence of the sensor-dictated errors is thereby eliminated or at least greatly attenuated.

In further embodiments of the control method, only a position detection of the printed product is carried out, without the image content being taken into account. Only a contour of the printed products is of interest for this purpose. Said contour can be determined for example by a method disclosed in the patent application CH 766/08 entitled "Optical position detection" from the same applicant, which was filed on May 21, 2008.

Experiments have shown that, depending on the requirements, a single optical sensor is sufficient for achieving reliable product detection with a high detection rate in order to carry out the control method according to the invention.

Advantageously, the electronic image is previously converted into a corrected image on the basis of correction indications. The correction indications bring about a conversion of a recording perspective of the at least one optical sensor into a desired perspective. Since the influence of the perspective view—caused by the recording perspective—of the detected printed product is eliminated or at least greatly attenuated by the correction, the correction is also called rectification. If the recording direction is arranged obliquely for example relative to a plane defined by a printed product (that is to say an angle of inclination is less than or greater than 90°), then a rectangular printed product has a trapezoidal contour on account of the perspective view on the electronic image. On the corrected image, the contour of the printed product is rectangular again as in the reference image and has to the greatest possible extent the same proportions as the reference printed product contained in the reference image.

Desired perspective is understood hereinafter to mean a perspective which permits a hindrance-free comparison, or at least comparison with little hindrance, between the corrected image with the detected printed product and the reference image. The corrected image ideally corresponds to an image detected by an optical sensor, the recording direction of which is arranged substantially at right angles with respect to a plane defined by the printed product. Ideally, the desired image corresponds to a flatbed scan of the printed product to be controlled. In practice, the desired image originates for example from a unit disposed upstream as seen in the flow direction, such as, for instance, a rotary printing machine or the prepress stage thereof.

Depending on the requirement made of the control method, the correction indications are based on geometry data or at least one image content of the printed products. In this case, geometry data can be formed for example by the format or the form of the printed products, while the image content is typically formed by printed text, text columns, lines, patterns and the like.

The correction indications can be generated for example by an electronic image with a reference printed product and a reference image likewise present in electronic form being fed to an image processing unit, which calculates therefrom the correction indications for this sensor. In further embodiments, instead of the reference image, a comparison on the basis of a reference value can be effected.

The correction indications are present in the form of command-like information or instructions and commands, on the basis of which pixels of the electronic image are converted into corresponding pixels of the corrected image. Depending on the embodiment, the correction indications are present in the form of a vector matrix, which bring about the rectification for corresponding pixels of the electronic image. Depending on the embodiment of the control method, the correction indications are present for example in the form of a reference table or reference values. The correction indications are typically generated prior to a production process and are based on the abovementioned geometry indications of the image content of the detected printed product.

Depending on the embodiment of the control method, although sections of the electronic image which do not pictorially reproduce a region of the print event to be controlled are likewise corrected during the conversion, they are then excluded from subsequent image further processing. In order to illustrate this process, mention shall be made here of an example of a rectangular electronic image with an image of a printed product which has a rectangular contour in the reference image. In the electronic image, however, the printed product has a trapezoidal contour for perspective reasons.

During correction, the rectangular format of the electronic image is altered such that, under certain circumstances, it no longer has simply definable format limits. For this, the format of the printed product that is shown in the corrected image substantially again corresponds to the format of the reference printed product on the reference image. For the downstream image further processing, only a specific image excerpt from the corrected image, for example a square region, continues to be used, while the rest is deleted.

Depending on the embodiment of the control method according to the invention, the correction indications are stored on the image processing unit or are fed to the image processing unit for carrying out the perspective correction. For the present invention, it is irrelevant whether the correction indications for the current sensor position relative to the detected printed products have been determined fully automatically or manually, for example by means of scanning or optical detection of one reference printed product or a plurality of reference printed products, or have been generated on the basis of an input via the display of a machine, or a combination thereof. All that is crucial is that the function is ensured.

The corrected image is subsequently compared with a reference value or a reference image. At least one signal is generated on the basis of the result of this comparison. Depending on the requirement, the reference value or the reference image has been detected, learned or input prior to the actual production process.

Reliable detection of image contents of printed products which, at the time of their detection by the sensor, are not arranged in a plane, or are only partly arranged in a plane, for example because they had one or more freeform areas and the image contents or other properties potentially suitable for detection are situated precisely in the region of the freeform areas, has not been possible heretofore using known methods. In contrast thereto, the control method according to the invention is also suitable for the detection of properties of bent printed products in freeform area fashion.

Possible examples of further freeform areas are, for instance, bent corner regions or folded printed products and/ or folded printed sheets which bulge in the fold region and thus cause a curvature of a cover or a planar side of the printed product. The method according to the invention can reliably detect properties and/or features even when a combination of the freeform areas mentioned above occurs, for example when printed sheets bent by the airstream graze at a deflection of the conveying path at a free corner along a baffle and the recording direction of the optical sensor is arranged at a free angle with respect to the printed product. At a free angle is understood to mean, for example, an inclination of the recording direction with respect to a plane defined by the printed product both in the conveying direction and transversely with respect to the conveying direction. A corresponding arrangement is possible according to the invention even upon the absence of a defined plane of the printed products owing to freeform areas. In the case of recording directions with a larger or smaller free angle, experience shows that the reflection of those sides of the printed products which face the optical sensor greatly impairs the quality of the electronic images. Typical values for angles of inclination which lead to good control results lie between approximately 30 degrees and approximately 150 degrees. The angle of inclination can also be adapted to the conveying direction of the conveying means as required.

The corrected image offers an ideal basis for image content and/or product detection. The rectification of the perspective is essential to the quality and the reliability of the detection since otherwise image contents or subjects offset for an optimum (desired) position and (desired) orientation cannot be recognized or can scarcely be recognized economically. Even comparatively simple image contents such as characters, geometrical elements (lines, circles), images or patterns, under perspective conditions, can immediately be recognized by a human observer during a comparison with the reference image, but have not previously been able to be reliably automated and recognized as such using apparatuses from the prior art. An automated search by machine of identical image contents within a predetermined search region on printed products can be carried out satisfactorily using typical apparatuses from the prior art only when the recording direction of the optical sensor during the detection of the printed product to be examined is arranged at right angles with respect to a plane in which the printed product to be controlled is situated. However, this condition can scarcely be implemented in practice owing to the often confined spatial conditions for the relevant apparatuses.

Moreover, the corrected image makes it possible to distinguish between faulty and correct printed products more reliably in comparison with known control methods of print finishing and thus contributes significantly to the economic viability.

In order, in the context of detection of image contents of the printed product, to further increase the reliability of the detection, it is advantageous, depending on the embodiment, if no contour/edge regions of the printed product and, as a result, no disturbing background are imaged on the electronic image.

One advantage of the control method according to the invention is that both the geometrical properties of the detected printed products that are contained in a single electronic image and the image contents of the electronically detected printed products can be evaluated as necessary. Evaluation as necessary is understood to mean, for example, a parallel or sequential evaluation in which, in a first partial step, the electronic image is examined for a desired adhesive field, for instance is examined for applying a Memostick®, while the same electronic image is likewise utilized in a second partial step, for instance in order to determine an edge position of the printed product for a downstream paginating unit.

A further advantage of the control method according to the invention is that the optical control is independent of the conveying direction of a conveying means that transports the printed products with respect to the optical sensor. Depending on the requirements, the same method can even be used for an advancing and returning conveying means, without the need for a change to the apparatus used for this purpose.

A person skilled in the art recognizes that the present invention considerably extends the area of use for optical controls by comparison with known methods. With the control method according to the invention, in comparison with conventional control methods, even hitherto unusable locations such as, for instance, deflection points of conveying means, transfer points, imbricated flows, printed products that are transported in a suspended fashion and are deformed by the airstream, and similar conveying sections along conveying paths can be actively utilized for the detection of printed products. Depending on the embodiment of the apparatus, an apparatus suitable for this purpose for carrying out the method according to the invention can also be constructed modularly and be shifted to the conveying path as necessary if this is required by an additional control of the printed products. What is crucial is that the correction indications always refer to a specific sensor position with respect to the substantially identically deformed and/or conveyed printed products. If the sensor position is altered, this requires new correction indications.

A further advantage of the control method according to the invention is that the printed products do not have to be separated during the optical control, but rather can remain in their product stream, thus for instance an imbricated flow.

Depending on the use of the control method according to the invention, information obtained from the electronic images concerning the relevant printed products can be utilized as a decision basis concerning the further treatment of certain predetermined criteria of corresponding printed products. As required, the treatment can be a discharge of incorrect or faulty printed products or a special treatment or aftertreatment, for instance in the form of a readjustment of printed products which are correct but excessively displaced with respect to a desired position or desired orientation.

As required, a signal instigated by an image processing unit as a result of an image comparison can be utilized as an error message that provides an operator for example with an indication about a non-operating or defectively operating feed conveyor station or a defective processing station. If the abovementioned signal additionally contains values, these values can be utilized for example by a machine regulating system for the automatic readjustment of upstream or downstream installations or installation parts. If, by way of example, a region in the fold region of the printed products is detected by an optical sensor directed laterally, as viewed in the conveying direction, at the printed products conveyed in the imbricated flow, then a respective key hole enclosed by side edges is contained on the electronic images. Said key hole is of interest for example in the case of a round band or a non-pressed band. The form and extent of the key hole is dependent on processing factors such as conveying speed and number of printed products per section, and on possible imbricated flow factors. In further applications, the control method according to the invention serves for determining processing factors which can be utilized by a local or superordinate control or regulating system.

By virtue of the control method according to the invention, the outlay for precisely setting up and adjusting the optical sensor with respect to the conveying means and/or the printed products transported thereby can be considerably reduced in comparison with apparatuses from the prior art since a precise positioning of the optical sensor for the image correction and the subsequent comparison at most still plays a subordinate part and sensor positioning is possible at a virtually arbitrary free angle with respect to the printed products. The control method according to the invention therefore allows a faster and hence more economic installation or changeover with a lower outlay than in the case of the known control apparatuses or control methods.

In further embodiments of the image conditioning method, the creation of the corrected images and/or the image processing thereof are/is effected in real time or virtually in real time. This allows use in automated high-performance systems appertaining to print finishing, which currently have processing capacities in the high-performance range in a processing line of currently approximately 40 000 to approximately 80 000 printed products per hour. Accordingly, the term real time is understood to mean processing times of the image processing unit which are less than or equal to a resultant operating cycle time or production cycle time of approximately 0.09 second in the case of 40 000 printed products per hour and approximately 0.045 second in the case of 80 000 printed products per hour. If the image processing cannot be carried out within the operating cycle time, in a further embodiment a first sensor detects, for example, only every second printed product, while a second sensor detects the printed products respectively lying in between. Depending on the computer capacity, the image processing can be carried out jointly by both optical sensors on the same image processing unit.

If contours of image contents and/or edges are intended to be made clear and/or emphasized for the downstream image processing, in further embodiments of the control method the electronic images are previously conditioned further by means of a suitable electronic filter, for example by being filtered using a sobel filter.

The control method according to the invention is likewise appropriate for the optical control of assembled printed products, if for example certain partial products and/or a main product are/is displaced relative to a desired position. In this case, it is irrelevant to the control method according to the invention whether the displacement of the printed product to be controlled is a translation, a rotation or a superimposition thereof. The control method according to the invention is ideally usable in diverse conveying and processing systems of print finishing, for example during collection, insertion or collation, such as are known, for instance, from CH 688091 A5, EP 341425 B1, EP 550828 B1 or EP 1539624 B1. In this case, it is also possible to detect complex phenomena in print finishing, such as, for example, folded printed products that lie with their fold astride one another and are displaced relative to one another, which move away from one another on account of the conical geometry as seen in cross section.

Further areas of application of the control method according to the invention are ideally to be found where position, orientation and/or content information of printed products is subsequently to be determined, particularly if the production thereof and the conveying is subject to production-dictated deviations/tolerances, as is the case, for instance, in the control of the position for a downstream paginating device, a misaligned sheet control, a control with regard to a presence of main and partial products during assembling (feeder control) or a control with regard to a correct orientation of printed products which are situated on saddles of transporters or saddle-stitching drums, collating drums, in delivery cylinders, or in regions of deflections of the conveying stream. The deviations are, for example, displacements and/or rotations of image contents with respect to reference values or reference positions. This holds true particularly when the extent of said displacements and/or rotations is previously unknown and/or irregular.

Depending on the requirements made with the control method, the step of comparing the corrected image with a reference value or a reference image comprises diverse embodiments. While in a first embodiment the corrected images are compared substantially directly with a reference value or a reference image by the image processing unit, in a second embodiment this is carried out by the corrected images being conditioned further prior to the comparison by means of one or more electronic filters.

In a third embodiment of the control method, the pixels of the corrected image and the pixels of a reference image with an optimally oriented reference printed product are transferred into the frequency domain, for example by means of a Fourier transformation or a fast Fourier transformation (FFT). The third embodiment is appropriate particularly when the intention is to detect objects such as, for instance, a format or format value and/or an image content or content value on printed products which have a different orientation.

In the example explained in greater detail below, the orientation forms a first property of the detected printed product to be controlled, while the position forms a second property of the detected printed product to be controlled. As required, the detection of the position and/or orientation of the printed products from the electronic images or the corrected images takes place in two or more stages. If only the position and the orientation of the printed products are of interest for the print finishing, a first partial step involves determining, for example, a possible torsion/rotation of the printed product in comparison with that of a reference printed product (orientation), while a second partial step involves determining displacements of a translational type of printed products in comparison with those of a reference printed product (positional offset).

The object on which the invention for the apparatus is based is achieved by means of the features of patent claim 11. Dependent patent claims 12 to 14 relate to further embodiments.

The apparatus according to the invention for the optical control of planar printed products in accordance with one of the control methods according to the invention has at least one optical sensor for detecting electronic images of printed products, and a conveying means for transporting the printed products past at least one optical sensor. Furthermore, the apparatus according to the invention comprises an image processing unit, which is designed for converting the electronic image into a corrected image on the basis of correction indications which bring about a recording perspective of the optical sensor or of the optical sensors into a desired perspective, for comparing the corrected image with a reference value or a reference image, and for generating at least one signal on the basis of a result of the comparison.

Depending on the embodiment of the apparatus, the image processing unit comprises a rectifying unit. Depending on the embodiment of the apparatus, the rectifying unit and the image processing unit are configured in a modular fashion, for example by being arranged on different printed circuit boards. This facilitates a use-specific configuration of the modules. If, by way of example, image rectification and image processing are required, then both modules are required, while at most only the rectifying unit is required for example in the case of pure contour detection in connection with a further image postprocessing unit.

Depending on the embodiment, the image processing unit has a reference table or a correction table or is operatively connected to such a table.

According to the requirements made of the reliability of the optical control, the spatial conditions and also the processing-technological boundary conditions, a distance between the at least one optical sensor and the printed products to be detected is variable. In typical applications, the distance is a number of centimeters or decimeters, and in one embodiment corresponds approximately to a diagonal of a printed product. If the distance is smaller, the advantages described further above are proportionally less than in the case of larger distances.

It goes without saying that embodiments in which the optical sensor is arranged in a stationary fashion or accompanies the printed products along a path section are also conceivable.

Depending on the embodiments of the optical sensor, the latter comprises at least one CMOS sensor chip. The CMOS sensor is a semiconductor detector for light measurement which is fabricated using CMOS technology and is also referred to as an active pixel sensor (APS).

In order to enhance the contrast of the electronic images, further embodiments of the apparatus according to the invention have an exposure source in the form of a reflected light source or a transmitted light source, which, as required, is formed, for example, by one or more fluorescent tubes.

The image processing unit of a further embodiment of the apparatus is designed for extracting orientation information of the printed product from the electronic image, for comparing the orientation information of the printed product from the electronic image with reference orientation information, and for generating at least one signal on the basis of a result of the comparison.

The invention is explained below with reference to figures, which only illustrate exemplary embodiments. In the figures.

Figure 1:
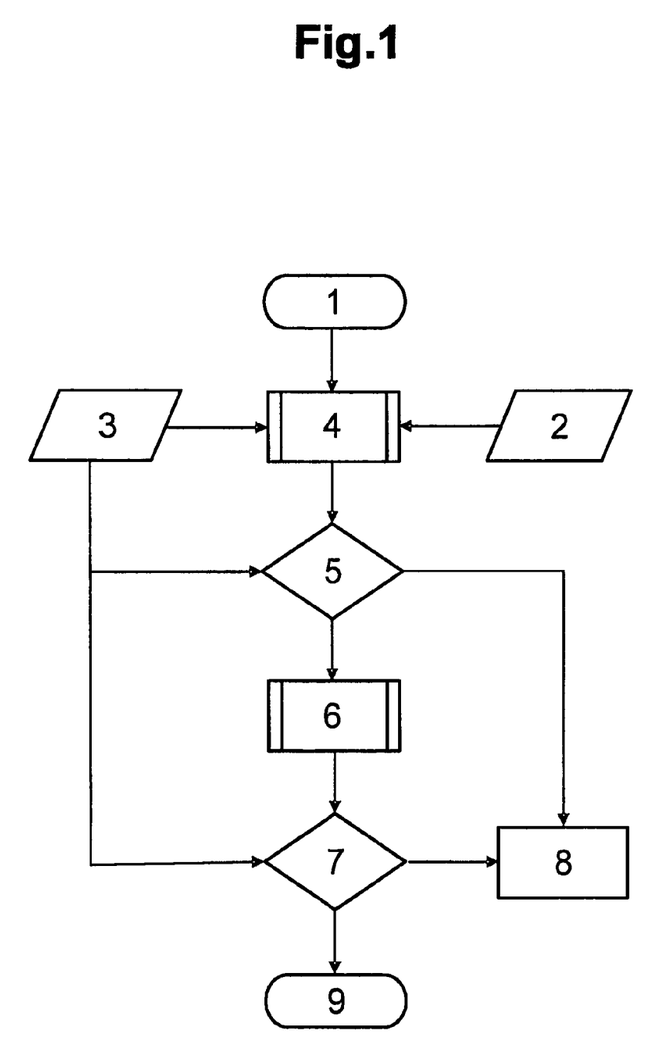
FIG. 1 shows a flowchart of a first embodiment of the control method according to the invention.

The flowchart of a first embodiment of the control method according to the invention as shown in FIG. 1 illustrates the basic set-up of the control method. After the starting 1 of the algorithm of the control method, a rectifying unit assigned to an image processing unit creates, from an electronic image 2 of an optical sensor and correction indications based on a reference image 3, a corrected image of the printed product to be controlled in a rectifying step 4. The rectifying step 4 is a type of subroutine of the algorithm initially mentioned. In this case, the correction indications are based on indications of the reference image 3 with a reference printed product or a corresponding reference value corresponding to the sensor position relative to the printed product.

In a first comparison step 5, the printed product contained in the corrected image is compared with that of the reference printed product or a corresponding first reference value. If no correspondence can be detected during the comparison, it is inferred from this that the controlled printed product on the corrected image is an incorrect or a faulty printed product and the outputting of a first signal is instigated. By contrast, if a correspondence of the first property can be detected, then the controlled printed product on the electronic image is interpreted as a correct printed product. In the present embodiment of the method, a correction of the electronic image is based on the format and hence the contour of the printed product on which the detected image is based.

If the controlled printed product on the electronic image has been interpreted as a correct printed product in the first comparison step 5, a subalgorithm 6 searches for at least one property of the printed product in the corrected image. In a subsequent second comparison step 7, the printed product in the corrected image is compared with the reference printed product on the reference image 3. Since the second property is an image content in the present case, the reference images or values in the first and second comparison steps are different. Unlike in the preceding rectifying step, in the detection by subalgorithm a printed image content of the reference printed product forms the comparison basis. If reference images of reference printed products are used instead of the reference values, although they are identical in both comparison steps, different information is extracted therefrom in the first and second partial steps.

Analogously to the first comparison step 5, in the second comparison step 7 once again a distinction is made between sufficient correspondence and insufficient correspondence. In the case of the latter, a second signal is initiated, which, in the present embodiment, substantially corresponds to the first signal and is utilized for a special treatment 8 of the printed products interpreted as incorrect or faulty. The printed products identified as correct are released for print finishing. A stop 9 defines the end of the detection algorithm. As required, each printed product identified as correct is assigned a corresponding further signal, which can continue to be used for example by a machine control or machine regulating system and/or a superordinate control/regulating system.

Figure 2:
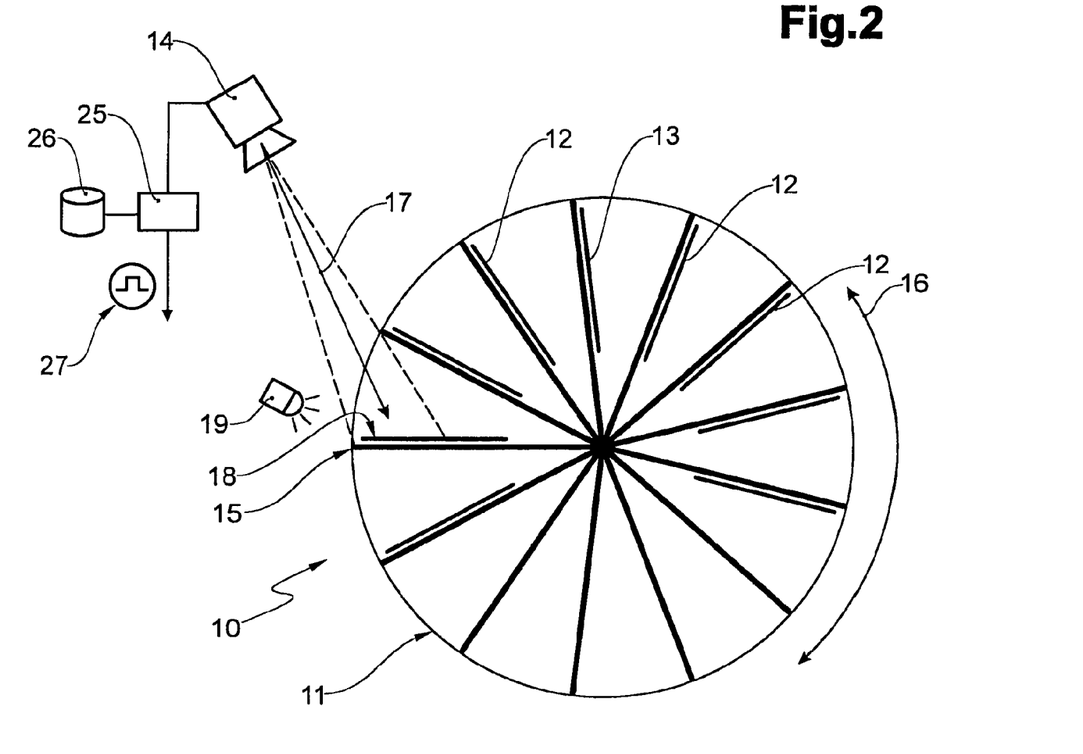
FIG. 2 shows a simplified illustration of an apparatus for carrying out the control method according to the invention.

It emerges from the schematic, simplified illustration of an apparatus 10 for carrying out the control method according to the invention, as shown in FIG. 2, that a conveying means 11 is formed by a collating drum shown in side view, which in this case simultaneously serves as part of a processing means for the printed products 12, 13 to be controlled. The printed products 12, 13 to be controlled bear against a pocket wall of the collating drum 11 on one side and in each case in a planar manner. An optical sensor 14 is arranged at a distance from the collating drum 11 in a radial direction. In the present case, the sensor 14 is displaced relative to a vertex 15 of the collating drum 11 counter to the conveying direction 16 in order to ensure a view of the printed product that is as ideal as possible. In this case, the conveying direction 16 could also rotate in the clockwise direction, without the detection method according to the invention being adversely affected by this. A recording direction 17 of the optical sensor 14 is consequently arranged obliquely relative to the respective pocket of the saddle-stitching drum 11 in such a way that at least a significant proportion of the printed products 12, 13 to be controlled is situated in a recording region 18 of the optical sensor 14. In this case, the optical sensor 14 is additionally displaceable in the direction of a rotation axis defined by the collating drum 11, without the detection method according to the invention being adversely affected by this.

As an alternative to the collating drum, the conveying means could also be formed by a saddle-stitching drum (not illustrated). In this case, the folded printed products are arranged astride saddles of the collating drum in the fold region.

In the test operation mode, the optical sensor 14 comprised a CMOS sensor chip, which detects electronic images 2 of image excerpts—determined as representative prior to the production process—having a size of comparatively few pixels for the corrected images or reference images in, for example, 8-bit gray levels in the machine or conveying cycle of the conveying means 11. By virtue of the comparatively small number of pixels arising, the volume of data arising in the image processing was able to be kept small, which fostered real time processing, without the detection rate being detrimentally affected. In order to enhance the image contrast of the electronic images 2, a reflected light source 19 in the form of a fluorescent tube, which illuminates the recording region 18, is arranged at the vertex 15.

The optical sensor 11 is connected to an image processing unit 25 comprising a rectifying unit, which is connected to a correction table 26. During test operation, the correction indications were present in the form of a vector matrix in order to bring about the desired rectification of the perspective for the pixels—assigned to them—of the printed product imaged on the electronic image. The correction table 26 is advantageous since it fosters comparatively rapid image processing on account of the comparatively small volume of data. The apparatus 10 according to the invention generated the correction indications prior to the actual production process on the basis of reference images with correct reference printed products for the sensor position, which was also maintained in the actual production process.

The rectifying unit serves for generating the corrected images 4 on the basis of the electronic images and the correction indications. The image processing unit 25 serves for the correlation comparison and as an instigator of at least one signal 27 corresponding to the correlation results.

Figure 3:
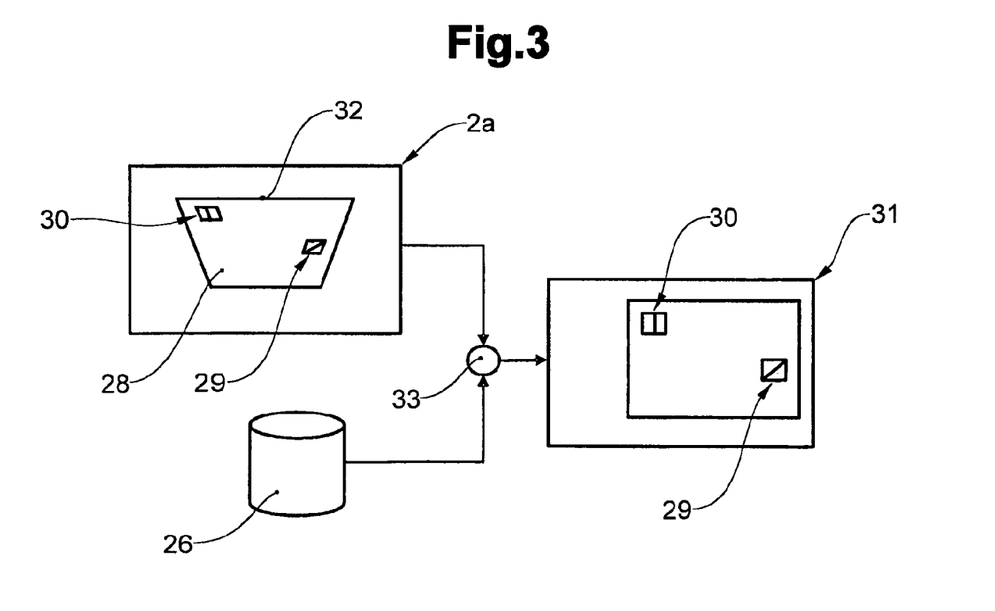
FIG. 3 shows a schematic illustration of the creation of a corrected image.

In the electronic image 2a—shown in FIG. 3—of a printed product that is correct and is correctly oriented relative to a desired position and desired orientation, that is contained the image to be controlled of the printed product 28 on account of the recording direction of the optical sensor 14, said recording direction not being arranged at right angles with respect to the pocket wall of the saddle-stitching drum, in perspective view. The resulting distortion relative to a desired image or the reference image makes it more difficult or impossible to reliably detect the image content for an image comparison and therefore requires rectification. The electronic image 2a contains a first image content 29 and also a second image content 30 of the printed product to be controlled. The image contents will be discussed in even greater detail later.

The rectification of the electronic image 2a affects the representation of the image of the printed product 28 that is contained on the electronic image 2a as follows. During the creation of the corrected image 31 on the occasion of the rectifying step 4, in the present example, what is of primary importance is not the actual image content such as, for example, the first image content 29 or the second image content 30 (shown here in the form of patterns), but rather geometry data of the printed product to be controlled per se, here in the form of a printed product contour forming the correction property. During the creation of the corrected image 31 on the basis of the electronic image 2a, the printed product to be controlled, which is rectangular in reality and which has a trapezoidal contour profile on the electronic image 2a, is rectified in such a way that, on the corrected image 31, it has to the greatest possible extent the rectangular contour and to the greatest possible extent the same proportions as the real printed product 12 contained in the reference image. After the rectification, therefore, the geometry data 32 of the correct printed product 12 to be controlled here substantially correspond to those of a desired or ideal image—that is to say those of a reference printed product, such that a recording perspective of the optical sensor is converted into a desired perspective. The correction indications necessary for this purpose pass from the correction table 26 to the rectifying unit 33.

Figure 4:
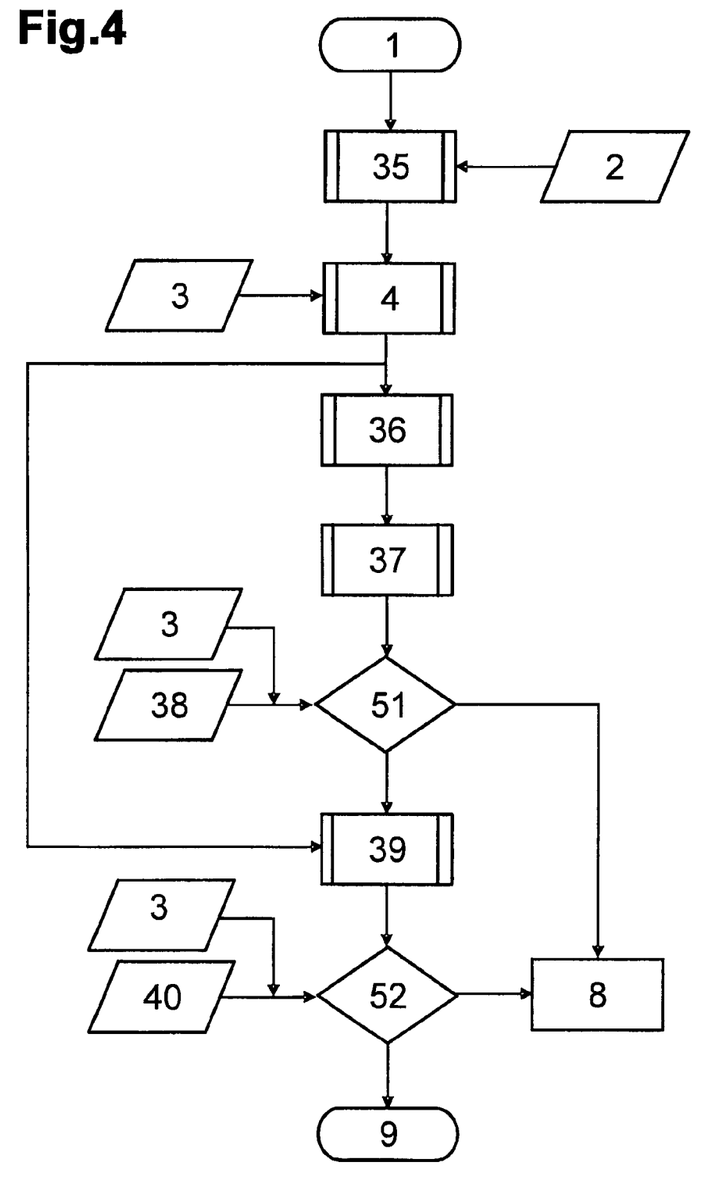
FIG. 4 shows a flowchart of a further embodiment of the control method according to the invention.

It emerges from the flowchart of a second embodiment of the control method according to the invention, as shown in FIG. 4, that a corrected image generated on the occasion of the rectifying step 4 of the electronic image 2 serves as a basis for a two-stage determination of the position and the orientation of the image of the printed product 28 that is contained on the electronic image 2 with a correct printed product imaged on the reference image 3. With regard to the rectifying step 4, reference is made to the description of FIGS. 1 and 3.

Depending on the requirement, a variant of the control method without the rectifying step 4 is possible. However, such an embodiment is not discussed any further below.

A first partial step clarifies whether the image of the printed product 28 is rotated relative to the reference printed product contained on the reference image 6, and the magnitude of a possible rotation offset in the form of its rotation angle. The orientation and the position of the reference printed product contained on the reference image 3 are deemed to be ideal for the purposes explained below, for which reason the reference image 3 here corresponds to an ideal image. The reference image 3 was once again generated by the apparatus according to the invention prior to the actual production process.

Possible sensor-dictated errors are eliminated as far as possible for each electronic image 2 in a preparation step 35 before the rectifying step 4 by means of a conversion of the electronic image 2 by means of a Fourier transformation into the frequency domain, suitable electronic filtering and a subsequent inverse transformation into the real domain. Depending on the requirement, a variant of the control method without this preparation step 35 is possible. However, such an embodiment of the method is not discussed in any greater detail below.

In the present case, the reference image 3 originates from a previous printing process and substantially corresponds to a scan of a correct and correctly oriented printed product on a flatbed scanner. A second partial step clarifies whether the printed product imaged on the corrected image is displaced relative to the printed product on the reference image 3. Possible displacements of a translational type in the conveying direction, and also transversely with respect to the conveying direction, are determined in this case.

In the first partial step, the corrected image is decomposed in a first transformation step 36 by means of a fast Fourier transformation and the resulting spectrum is converted into the frequency domain. Absolute value formation of the resulting spectrum then follows. In a next step, the second transformation step 37, the corrected image converted into the frequency domain is subjected to polar transformation in order that the rotation offset can be determined independently of a translation offset possibly present. The rotation offset is converted into a fictitious translation offset. In the second transformation step 37, a comparison spectrum is generated, which forms orientation information for the comparison.

Analogously, the reference image 3 also undergoes the first transformation step 36, absolute value formation and the second transformation step 37. In contrast to the comparison spectrum, however, here a reference spectrum is generated, which forms the reference orientation information.

On the basis of a first correlation 51, the comparison spectrum is compared with the reference spectrum and a first correlation value is formed. In this case, the first correlation value reflects a first correlation quality, that is to say a degree of correspondence of the corrected image to the reference image 3. In the present embodiment, the correlation quality increased in experiments in the event of increasing similarity of the images. In order to be able reliably to distinguish noise present in the frequency domain or the correlation matrix from an actually present rotation of the detected printed product by the rotation angle, a first threshold value 38 was defined. Experiments showed that those printed products which led to first correlation values which were less than the first threshold value 14 were reliably incorrect or faulty printed products 13.

A signal that fails to appear on account of the first correlation has the effect that the second partial step is actually performed. As preparation for the second partial step, the corrected images of the printed products 12 identified as correct are electronically rotated back in a rotation step 39 by their rotation angles determined, if necessary using likewise stored direction information. For this purpose, the buffer-stored rotation angle and the buffer-stored corrected image are retrieved, which were or are calculated on the basis of the orientation information and the reference orientation information.

A position detection and an offset calculation of an image 28—offset in the electronic image 2—of the printed product with the desired position of a reference printed product on the reference image can be carried out in a known manner by the person skilled in the art, for which reason this will not be discussed in any greater detail at this juncture.

On the basis of a second correlation 52, the rotated-back corrected image 31 is compared with the reference image 3 and a second correlation value is formed. In this case, the second correlation value reflects a second correlation quality, that is to say a degree of correspondence of the rotated-back corrected images 31 and the reference image 3, which correlates to the correspondence of the position of the printed product to be controlled that is imaged on the corrected image 31 to the position of the reference printed product contained on the reference image 3. In the present embodiment, it was found in experiments that the second correlation quality increased in the event of increasing similarity of the images. In order to be able reliably to distinguish noise present in the correlation matrix from an actually present translation of the detected printed product, a second threshold value 40 was previously defined.

Experiments showed that those printed products which led to second correlation values which were less than the second threshold value 40 were reliably faulty printed products 13, while second correlation values which corresponded to the second threshold value 40 or were greater than the second threshold value 40 reliably involved correct printed products 12—in the present case identical printed sheets.

Analogously to the first correlation 51, in the case of printed products interpreted as faulty, after the second correlation 52, a signal is again output which can be utilized for a special treatment 8 of the printed products interpreted as incorrect or faulty.

As already during the comparison on the basis of the first correlation, in the present case, during the comparison on the basis of the second correlation, too, the image content of the detected printed product and of the reference printed product is of primary importance. In further embodiments, however, for the comparison on the basis of the first correlation and/or during the comparison on the basis of the second correlation, under certain circumstances, geometry data such as, for instance, a format/contour 32 or a form of the printed products to be controlled could also be realized.

In a further embodiment of the method, the second partial step is carried out before the first partial step.

Figure 5:
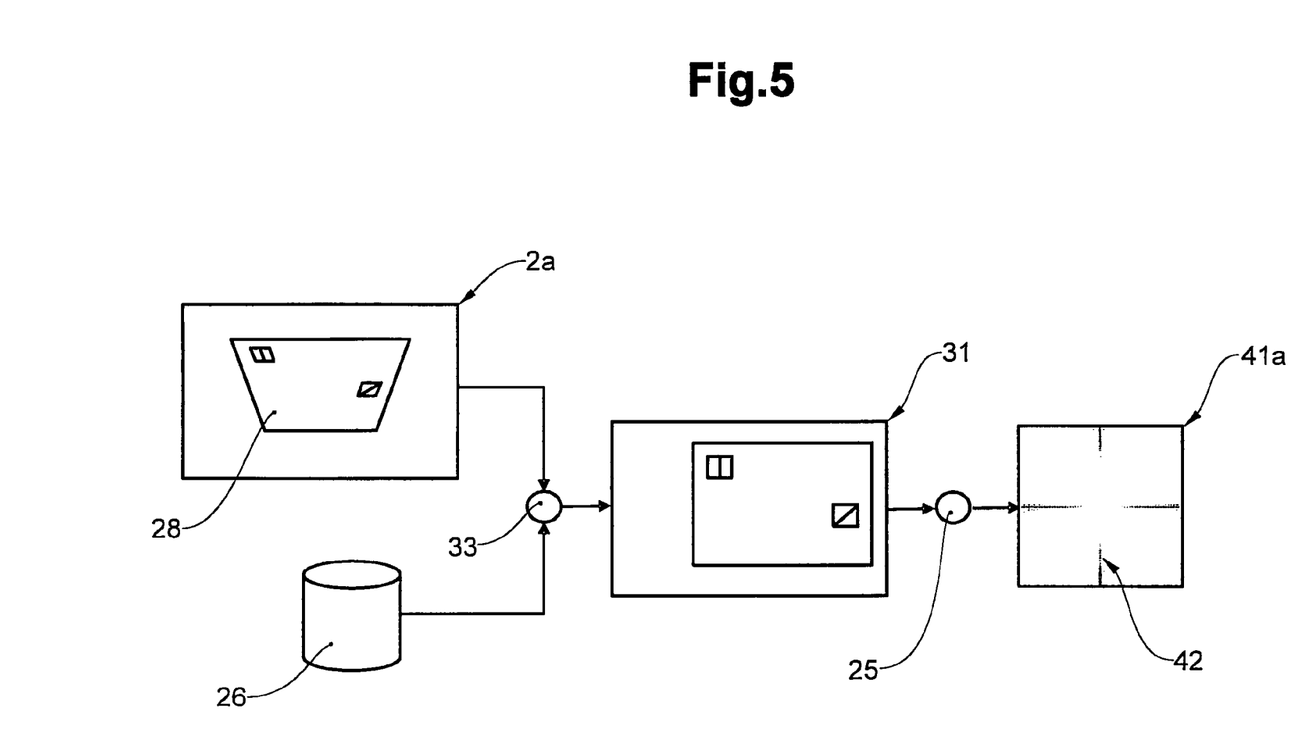
FIG. 5 shows a schematic illustration of the creation of a corrected image in accordance with FIG. 3 with a representation of the comparison spectrum generated therefrom.

With regard to the electronic image 2a designated in FIG. 5 and its conversion into a corrected image 31, reference is made to the description concerning FIG. 3. The image processing unit 25 generates a graphically representable comparison spectrum 41a from the corrected image 31. In the comparison spectrum 41a, a comparatively clear first pattern 42 is discernible, which correlates to the orientation of the printed product on which it is based.

In the case of FIGS. 6 to 9 discussed below, the comparison spectra are generated in a manner analogous to that in FIG. 5. For simplification, therefore, only the relationship of the electronic images with the comparison spectra generated therefrom is demonstrated.

Figure 6:
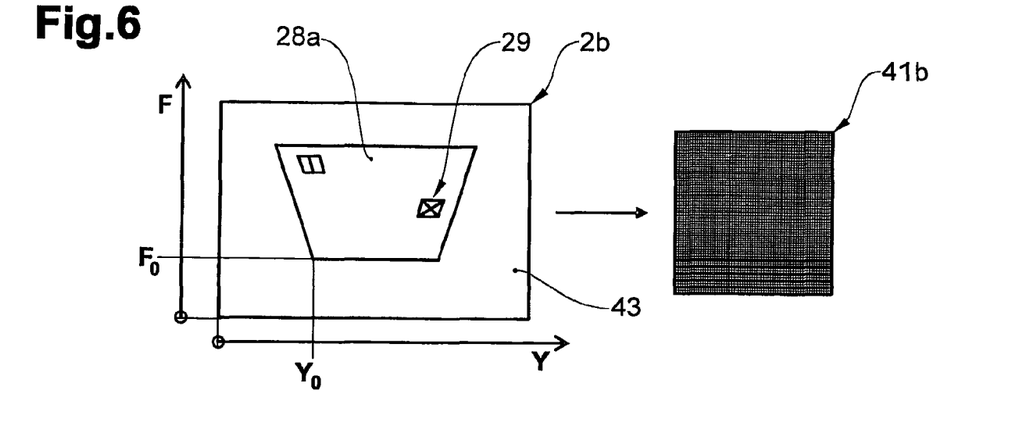
FIG. 6 shows an electronic image of a printed product which, although correctly positioned, is nevertheless incorrect, with a representation of the comparison spectrum generated therefrom, analogously to FIG. 5.

The electronic image 2b shown in FIG. 6 shows a printed product in the position and orientation of the printed product represented in FIG. 5, against the same background 43. However, the image of the printed product 28a that is shown here differs from the image of the printed product 28 that forms the reference printed product in the region of the first image content or feature 29, which differs only slightly from the first image content or feature of a correct printed product or of the reference printed product. Accordingly, this printed product is an incorrect printed product 13. Despite the comparatively small difference in terms of image content given the same image background, this has an unexpectedly great effect in the illustrated comparison spectrum 41b of the controlled printed product since, in contrast to the comparison spectrum 41a of the correct printed product, the first pattern cannot be discerned at all in the comparison spectrum 41b of the incorrect printed product 13.

Figure 7:
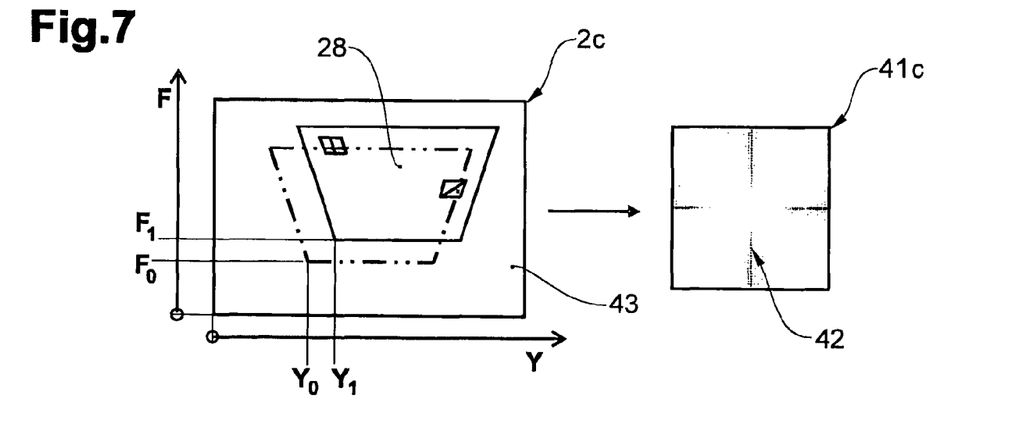
FIG. 7 shows an electronic image of a correct printed product that is translation-offset relative to the position in FIG. 5, with a representation of the comparison spectrum generated therefrom, analogously to FIG. 5.

The situation shown in FIG. 7 looks different in the case of the image 28 of a printed product 12 which, although correct and correctly oriented, is translation-offset relative to the position shown in FIG. 5 at the position $F_0$ in the conveying direction and $Y_0$ transversely with respect to the conveying direction F and is situated at the position $F_1$ in the conveying direction and $Y_1$ transversely with respect to the conveying direction F. In the corresponding comparison spectrum 41c of such a displaced printed product, the translation offset does not affect the pattern. The pattern corresponds to the first pattern 42, which is based on the correct printed product/reference printed product. Consequently, a translation offset of the printed product to be controlled is invariant relative to a reference printed product contained on a reference image in the comparison spectrum. It goes without saying that the maximum permissible translation offset is variable as necessary and depending on the requirements. In further embodiments of the method according to the invention, the pixels are not necessarily close together, but rather are divided into two or more partial regions. The partial regions can have a linear or strip-shaped form for example.

Figure 8:
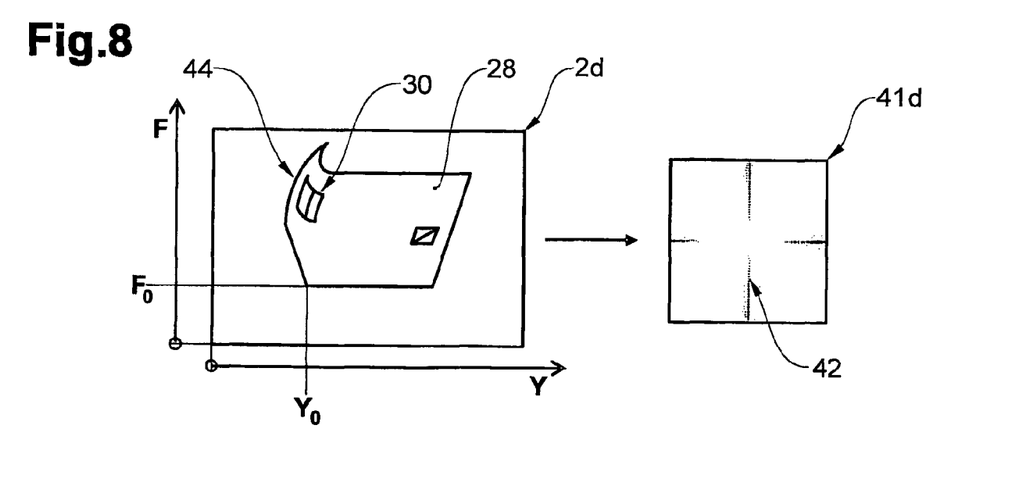
FIG. 8 shows an electronic image of a correct printed product that is partially spatially bent relative to that in the position in FIG. 5, with a representation of the comparison spectrum generated therefrom, analogously to FIG. 5.

Similarly to FIG. 7, the electronic image 2d shown in FIG. 8, said image showing an image of the printed product 28 with a spatially bent corner 44 and accordingly a distorted second image content of the second feature 30, leads to a comparison spectrum 41d that once again corresponds to the comparison spectrum 41a of the reference printed product.

Figure 9:
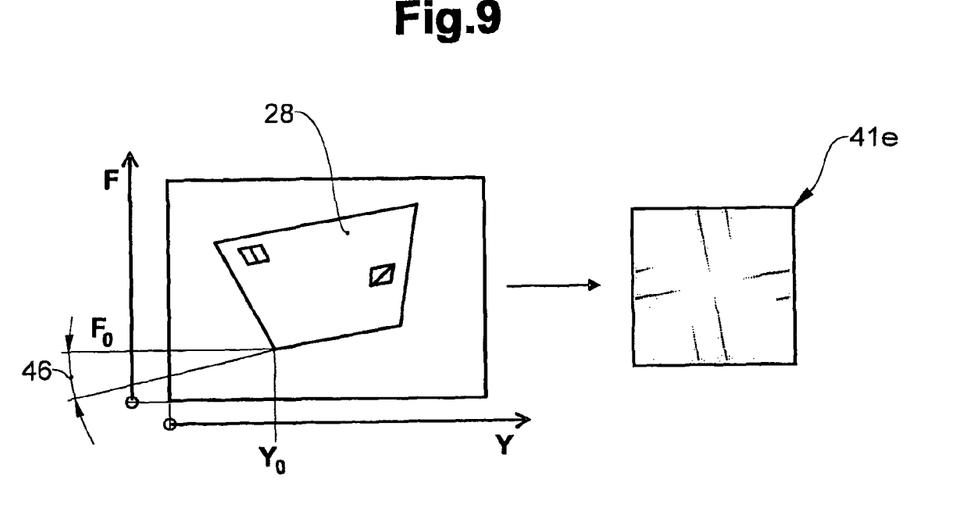
FIG. 9 shows an electronic image of a printed product that is rotation-offset relative to the position in FIG. 5 but correct, with a representation of the comparison spectrum generated therefrom, analogously to FIG. 5.

A rotation offset—elucidated with reference to FIG. 9—of the printed product to be controlled with respect to the orientation of the reference printed product, in the comparison spectrum, has a different effect, however, relative to the translation offsets and spatial deformations of the printed product to be controlled as shown with reference to FIGS. 7 and 8. An image 28 of a printed product 12 which, although correct, is rotated by a rotation angle 46 relative to the orientation shown in FIG. 5 is visible on the electronic image 2e. In the correspondingly illustrated comparison spectrum 41e, this leads to a second pattern 45, which differs significantly from the first pattern 42 of the reference printed product. Experiments showed that even a comparatively small orientation deviation with a rotation angle 46 of the printed product to be controlled with respect to the reference printed product of approximately one degree led to a surprisingly different second pattern 45 in the comparison spectrum. Not least for this reason, such a control behavior is optimally suitable for the optical control of an orientation of printed products since the more clearly a degree of differentiation can be ascertained during the comparison, the higher the reliability rate of the entire control method. In this case, the rotation angle 46, in the Cartesian coordinate system, could lie in the first or in the fourth quadrant (as seen in the counterclockwise direction). This maximum permissible rotation angle 46 allowed disturbance-free downstream processing. It goes without saying that the maximum permissible rotation angle 46 is variable as necessary and depending on the requirements. In the present embodiment, a second computation operation was required to determine a possible negative angle in the fourth quadrant. If a permissible rotation angle 46 of more than 90° in the Cartesian coordinate system is intended to be determined, corresponding additional computation operations are required for the further quadrants.

Figure 10:
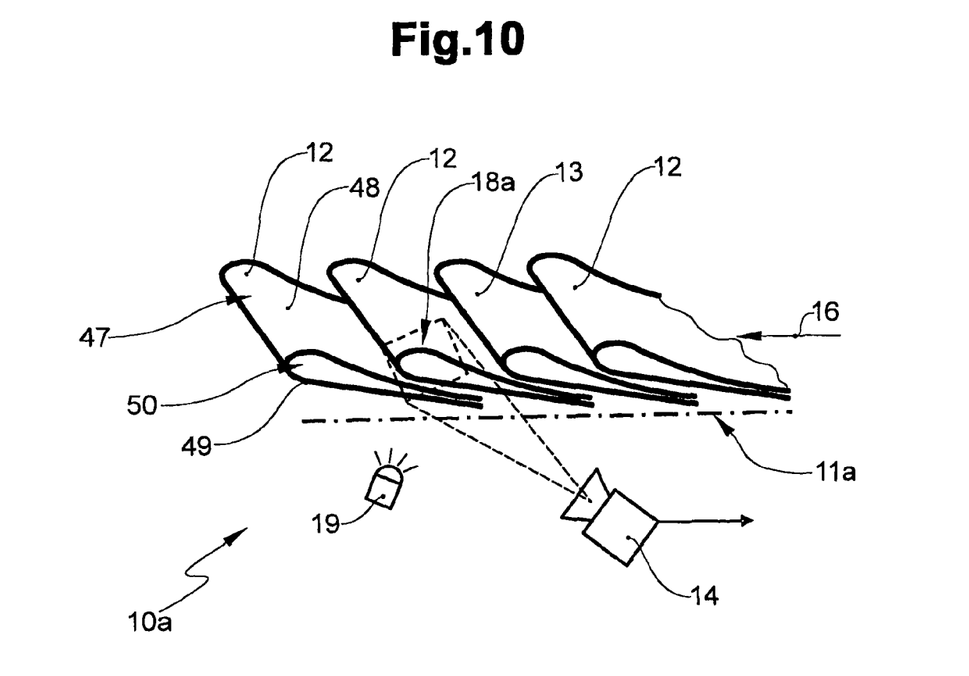
FIG. 10 shows a simplified illustration of a further apparatus for carrying out the control method according to the invention.

FIG. 10 shows an excerpt from a further apparatus 10a according to the invention, in a simplified illustration. A multiplicity of printed products 12, 13 lie in an imbricated formation on a conveying means 11a, which guides the printed products 12, 13 along the conveying path or direction 16 past a stationary optical sensor 14. In this embodiment, the printed products 12, 13 comprise folded printed sheets each having a leading fold 47 as seen in the conveying direction 16. In this case, the top side 48 and underside 49 of each printed product that adjoin the fold 47 do not lie on one another in the fold region, but rather curve away from one another locally, such that they enclose a—in cross section—key hole 50 running in the fold direction. The optical sensor 14 is oriented in such a way that its recording region 18a encompasses the key hole 50. If necessary, a background cover (not shown) is necessary in order to be able to ensure a uniform, ideally homogeneous background for the printed products 12, 13 to be controlled on the electronic images. In order to enhance the contrast of the electronic images detected by the sensor 14, a reflected light source 19 is once again arranged.

LIST OF REFERENCE SYMBOLS

1 Start
2, 2a, 2b, 2c, 2d, 2e Electronic image
3 Reference image
4 Rectifying step
5 First comparison step
6 Subalgorithm
7 Second comparison step
8 Special treatment
9 Stop/end
10, 10a Apparatus
11, 11a Conveying means
12 Correct printed product
13 Incorrect/faulty printed product
14 Optical sensor
15 Vertex
16 Conveying direction
17 Recording direction
18, 18a Recording region
19 Light source
25 Image processing unit
26 Correction table
27 Signal
28, 28a Image of a printed product
29 First image content
30 Second image content
31 Corrected image 32 Geometry data
33 Rectifying unit
35 Preparation step
36 First transformation step
37 Second transformation step
38 First threshold value
39 Rotation step
40 Second threshold value
41a, 41b, 41c, 41d, 41e Comparison spectrum
42 First pattern
43 Background
44 Bent corner
45 Second pattern
46 Rotation angle
47 Fold
48 Top side
49 Underside
50 Key hole
51 First correlation
52 Second correlation

The invention claimed is:

1. An optical control method for use in print finishing, comprising:
   guiding a planar printed product along a conveying path past at least one optical sensor;
   capturing an electronic image by use of the at least one optical sensor, wherein the electronic image represents at least one region of the printed product;
   extracting orientation information from the electronic image using a frequency transformation of the electronic image, said orientation information reflective of an orientation of the printed product;
   comparing the orientation information of the printed product from the electronic image with reference orientation information based on a first correlation, wherein the reference orientation information is based on a frequency transformation of a reference image; and
   generating at least one signal that reflects a result of the comparison,
   wherein the at least one signal comprises a first signal, which initiates a special treatment of the printed product on which the electronic image is based, if a correlation value of the first correlation falls below a first threshold value,
   wherein a rotation angle between the controlled printed product and the reference printed product together with direction information is calculated on the basis of the orientation information and the reference orientation information, and
   wherein the electronic image is rotated back by the rotating angle in such a way that the printed product imaged thereon has the same orientation as the reference printed product.

2. The control method as claimed in claim 1, wherein extracting the orientation information comprises:
   generating a frequency transformation of the electronic image;
   performing absolute value formation on the basis of the frequency transformation; and
   generating the orientation information by use of a polar transformation based on the absolute value formation.

3. The control method as claimed in claim 1 wherein the reference orientation information is extracted from a reference image of a reference printed product, and wherein extracting the reference orientation information comprises:
   generating a frequency transformation of the reference image;
   performing reference absolute value formation on the basis of the frequency transformation; and
   generating the reference orientation information by use of a polar transformation based on the reference absolute value formation.

4. The control method as claimed in claim 1,
   wherein the rotated-back electronic image is compared with the reference image on the basis of a second correlation, and
   wherein the at least one signal comprises a second signal, which initiates a special treatment of the printed product on which the electronic image is based, if a correlation value of the second correlation falls below a second threshold value.

5. The control method as claimed in claim 4, wherein the second correlation is performed when the first correlation result is greater than or equal to the first threshold value.

6. The control method of claim 1, wherein at least extracting the orientation information takes place in real time, within an operating cycle time.

7. The control method of claim 1, wherein extracting the orientation information takes place on the basis of geometry data of the captured printed product.

8. The control method of claim 1, wherein extracting the orientation information takes place on the basis of at least one image of the captured printed product.

9. The control method of claim 1, further comprising compensating for sensor-dictated errors in the electronic image.

10. The control method of claim 1, wherein the electronic image is a corrected image.

11. An apparatus for carrying out an optical control method, the apparatus comprising:
    at least one optical sensor for capturing electronic images of printed products;
    a conveyor for transporting the printed products past the at least one optical sensor; and
    an image processing system configured to (1) extract orientation information of a printed product from the electronic image using a frequency transformation of the electronic image and (2) compare the extracted orientation information with reference orientation information based on a first correlation, which reference orientation information reflects a frequency transformation of a reference image, and (3) generate at least one signal that reflects a result of the comparison,
    wherein the at least one signal comprises a first signal, which initiates a special treatment of the printed product on which the electronic image is based, if a correlation value of the first correlation falls below a first threshold value,
    wherein a rotation angle between the controlled printed product and the reference printed product together with direction information is calculated on the basis of the orientation information and the reference orientation information, and
    wherein the electronic image is rotated back by the rotating angle in such a way that the printed product imaged thereon has the same orientation as the reference printed product.

12. The apparatus as claimed in claim 11, wherein the optical sensor, when capturing the electronic images, is at a distance from the printed products to be controlled, wherein the distance corresponds at least approximately to a diagonal of a printed product.

13. The apparatus as claimed in claim 11, wherein a recording direction of the optical sensor is arranged at a free angle with respect to the printed products to be captured.

14. The apparatus of claim 11, wherein the apparatus has a light source in the form of a reflected light source of a transmitted light source for enhancing the contrast of the electronic images.

15. The apparatus of claim 11, wherein the image processing system is further configured to:
   generate a frequency transformation of the electronic image;
   perform absolute value formation on the basis of the frequency transformation; and
   generate the orientation information by use of a polar transformation based on the absolute value formation.

16. The apparatus of claim 11, the image processing system is further configured to extract reference orientation information from the reference image of a reference printed product, comprising:
   generate a frequency transformation of the reference image;
   perform reference absolute value formation on the basis of the frequency transformation; and
   generate the reference orientation information by use of a polar transformation based on the reference absolute value formation.

* * * * *